United States Patent [19]

Theysohn

[11] 4,364,664
[45] Dec. 21, 1982

[54] DUAL WORM EXTRUDER HAVING WEAR RESISTANT BORE WALLS

[75] Inventor: Friedrich Theysohn, Hanover, Fed. Rep. of Germany

[73] Assignee: Firma Friedrich Theysohn, Langenhagen, Fed. Rep. of Germany

[21] Appl. No.: 243,149

[22] Filed: Mar. 12, 1981

[30] Foreign Application Priority Data

Mar. 20, 1980 [DE] Fed. Rep. of Germany ....... 3010659

[51] Int. Cl.³ .......................... A21C 1/06; B30B 3/04
[52] U.S. Cl. ..................................... 366/84; 100/146; 418/201; 425/204
[58] Field of Search ............... 366/84, 85, 86, 297, 366/298, 299, 301, 302, 303, 304, 305; 425/204; 418/201; 100/146

[56] References Cited

U.S. PATENT DOCUMENTS

| 3,078,511 | 2/1963 | Street ............................. 366/84 X |
| 3,268,949 | 8/1966 | Schmidt ............................. 425/204 |
| 3,696,736 | 10/1972 | Studu ............................. 425/204 |

FOREIGN PATENT DOCUMENTS 32569  6/1921  Norway ............................. 366/297

*Primary Examiner*—Edward J. McCarthy
*Attorney, Agent, or Firm*—Spencer & Kaye

[57] ABSTRACT

A dual worm extruder includes a worm housing having a cavity and a wear resistant insert accommodated in the cavity. The insert has two parallel extruder bores defining, when viewed together in cross section, passages of circular areas having an overlap. The outer surface portions of the insert situated on opposite sides adjacent the overlap are peripherally concave, whereby the cross-sectional outline of the insert has the shape of an hourglass.

6 Claims, 2 Drawing Figures

DUAL WORM EXTRUDER HAVING WEAR RESISTANT BORE WALLS

BACKGROUND OF THE INVENTION

This invention relates to a dual worm extruder which has a worm housing and an insert which is made of a wear resistant metal and which is accommodated in the housing. The wear resistant insert has two parallel-extending overlapping bores which, when viewed in cross section, form an open "8". Throughout its length, the insert has strictly constant dimensions to ensure an accurate fit in a complemental opening in the worm housing.

By "dual worm extruder" there are meant all conventional extruders or injection apparatus which are used in a great variety of fields for making plastic or rubber components and which, compared to extruders having only a single conveying worm have the advantage that the material is discharged in a more uniform manner. The housing for such a dual worm is so configured that the opening itself, when viewed in cross section, has the form of an open "8", that is, the bores for the two worms are open towards one another where they overlap. The two bores may be cylindrical throughout their length or may have a conical configuration.

Since the worms rotate in the worm housing and the clearance between the respective worm and the face of the associated worm housing has to be very small in order to build up the necessary pressure for injecting the material, the inner face of the worm housing is exposed to a continuous wear. Consequently, such inner face has to be of a material which is particularly wear resistant. For making a wear resistant surface in an extruder housing several methods have been known.

In principle, it is feasible to make the entire extruder housing of a particularly wear resistant material, such as high-grade steel. Because such material is very expensive, this solution, although technically highly satisfactory, would not be economically feasible. For this reason, the housing of the extruder is usually made of a significantly weaker (and less expensive) material and the bore faces are coated by a wear resistant layer.

In coating extruder housings with a wear resistant material, it is known, for example, to harden the inner face of the extruder housing by nitration which is effected under relatively low temperatures of approximately 500° C. With this method layers of maximum 0.7 mm thickness are obtained which is insufficient for many applications. In case greater layer thicknesses are desired with this process, higher temperatures have to be used which, however, can easily lead to deformations of the housing, resulting in the loss of its linear characteristics. Should this occur, the housing subsequently has to be straightened which involves the disadvantage that mechanical stresses will be "built" into the housing; these stresses may become free during the service of the extruder, again leading to a deformation of the housing. Such a deformed extruder can no longer be driven. It is a further disadvantage of this hardening process that the hardness obtained for the wear resistant layer is not sufficiently high for many applications.

A further method of providing a wear resistant layer on the inner face of the extruder housing involves the introduction into the housing, of a premade shaped body of wear resistant metal. This solution—with which the invention is concerned—is of particular advantage in dual worm extruders which have an inner housing surface of relatively complex configuration.

A dual worm extruder having a wear resistant insert is disclosed, for example, in German Accepted Published Patent Application (Auslegeschrift) No. 2,423,785 to which corresponds U.S. Pat. No. 4,028,027. The wear resistant insert disclosed therein has a periphery formed of either solely convex surfaces or of convex and planar surfaces. Such a wear resistant insert must be manufactured with great precision in case a throughout accurate fit and surface contact with the worm housing is desired. In particular, the transitions from the convex surfaces to the linear surface portions give rise to substantial manufacturing problems. The worm housing opening through which the wear resistant insert is to be introduced has to be made with high precision as well. Even the smallest deviations from the required dimensions may lead to the disadvantageous result that the wear resistant insert can simply not be introduced into the worm housing or that insufficient surface contact between the worm housing and the wear resistant insert is obtained. This deficiency leads to an unsatisfactory heat exchange.

To remedy the above-discussed disadvantage, in German Accepted Published Patent Application (Auslegeschrift) No. 2,558,611 there is disclosed a method according to which the outer dimensions of the wear resistant insert are intentionally reduced relative to the inner dimensions of the opening in the worm housing. The annular clearance defined between the outer face of the wear resistant insert and the inner face of the worm housing is filled with a brushable, hardening material. Thus, in an arrangement arrived at with such a process, there is no direct contact between the wear resistant insert and the worm housing; this again leads to an unsatisfactory heat removal from the worm cavity.

SUMMARY OF THE INVENTION

It is an object of the invention to provide an improved dual worm extruder having an wear resistant insert in which the cavity of the worm housing and the wear resistant insert are so dimensioned relative to one another in a simple manner that the wear resistant insert is, along the greatest part of its peripheral surface, in direct contact with the inner face of the worm housing.

This object and others to become apparent as the specification progresses, are accomplished by the invention, according to which, briefly stated, the opposite peripheral surfaces of the wear resistant insert in the zone between the bores are concave to thus give the cross-sectional outline of the insert an hourglass configuration.

The lateral peripheral surfaces of the wear resistant insert which have a convex shape and which are adjacent the concave surface portions may, similarly to the corresponding faces in the bore of the worm housing, be made with a very accurate, fine machining in a single operational step during a one-time clamping support of the worm housing. In the zone of the concave surfaces, on the other hand, no particularly precise finishing is necessary, since the wear resistant insert, after introduction into the worm housing, is, in those zones, not in a direct contact with the worm housing. Since the greatest part of the peripheral surfaces of the wear resistant insert lie directly against the inner surfaces of the worm housing, an ideal heat transmission between the two components may take place. In this manner, the worm housing and the wear resistant insert can be manufactured and assembled in a very simple manner. They together form a dual worm extruder which, in a very satisfactory manner, meets all requirements concerning economic manufacture, wear resistance and heat removal.

The clearance in the zone of the concave surfaces between the worm housing and the wear resistant insert may be filled with a flowable metal. It is, however, feasible to apply at least on one side of the wear resistant insert, a metal filling piece which may be of conical configuration.

DESCRIPTION OF THE PREFERRED EMBODIMENTS

Figure 1:
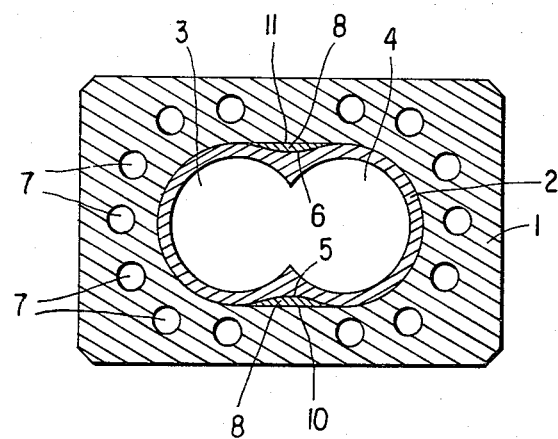
FIGS. 1 and 2 are cross-sectional views of two preferred embodiments of the invention.

Turning now to the Figures, there is shown a worm housing 1 of a dual worm extruder made, for example, of cast or forged steel. The housing 1 has a bore in which is positioned a wear resistant insert 2 made of a high-strength material, particularly high-strength steel. The wear resistant insert 2 has two bores 3 and 4 which extend parallel to one another and which overlap so that, when viewed in cross section, they form the FIG. "8" which is open in the middle. The bores may be cylindrical or conical, for receiving similarly shaped, material-conveying worms symbolically shown at 3a and 4a.

In the zone of transition between the two bores 3 and 4 the wear resistant insert 2 has on each side depressed, concave surfaces 5 and 6, whereas all other circumferential surfaces are of convex curvature. The wear resistant insert 2 lies with the convex surfaces directly—thus without any intermediate lyaer—against the inner, conforming surface of the worm housing 1 so that in these areas of contact which constitute the greatest part of the circumferential surfaces of the extruder, there is obtained an ideal condition for heat transmission to the worm housing 1. From the worm housing 1 the transmitted heat may be removed in a conventional manner by means of cooling channels 7.

The concave surfaces 5 and 6 require no particularly precise machining or finishing work. The clearance between the wear resistant insert 2 and the worm housing 1 in the zone of the concave surfaces 5 and 6 is filled with a flowable metal or metal mixture 8 (FIG. 1).

Figure 2:
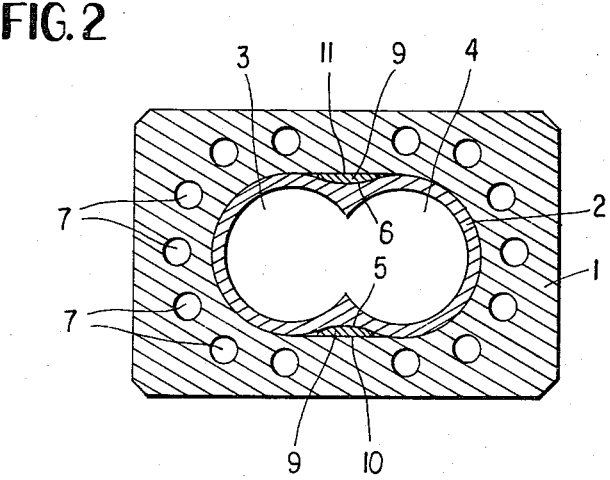

Instead of a flowable metal or metal mixture 8 it is feasible to insert into the clearance filler bodies 9 made of metal (FIG. 2). The filler bodies 9 may be of conical or wedge-shaped configuration and may serve for an additional positioning and immobilization of the wear resistant insert 2 in the worm housing 1. The provision of filler bodies 9 is particularly of advantage if a wear resistant insert has to be repaired or replaced. It is also possible to provide a filler body 9 only on one side of the wear resistant insert 2 and to fill the clearance on the other side with a flowable metal.

Preferably, the oppositely located surface portions 10, 11 of the housing cavity which are adjacent the respective concave surfaces 5, 6, are of planar configuration. This facilitates manufacture of the housing 1 and further, the clearance between the surfaces 5 and 10, as well as between the surfaces 6 and 11 is advantageously relatively large, ensuring that the flowable metal or metal mixture can be introduced without difficulties. An excessively narrow clearance, on the other hand, would tend to prevent the filler from flowing and thus from fully filling the clearance. This could lead to air inclusion which, in turn, would adversely affect the heat exchange between the wear resistant insert and the extruder housing.

It will be understood that the above description of the present invention is susceptible to various modifications, changes and adaptations, and the same are intended to be comprehended within the meaning and range of equivalents of the appended claims.

What is claimed is:

1. In a dual worm extruder including a worm housing having an inner wall defining a cavity; and a wear resistant insert accommodated in said cavity; said insert having two parallel extruder bores defining, when viewed together in cross section, passages of circular areas having an overlap; said insert having an outer surface formed of first surface parts facing first portions of said inner wall and being situtated on opposite sides of said insert in zones adjacent said overlap and second surface parts facing second portions of said inner wall and being situated peripherally adjacent said first surface parts of said insert; the improvement wherein said first surface parts are peripherally concave, whereby the cross-sectional outline of said insert has the shape of an hourglass; further wherein said first portions of said inner wall define a clearance with respective said first surface parts of said insert and further wherein a flowable metal fills at least one said clearance.

2. In a dual worm extruder including a worm housing having an inner wall defining a cavity; and a wear resistant insert accommodated in said cavity; said insert having two parallel extruder bores defining, when viewed together in cross section, passages of circular areas having an overlap; said insert having an outer surface formed of first surface parts facing first portions of said inner wall and being situated on opposite sides of said insert in zones adjacent said overlap and second surface parts facing second portions of said inner wall and being situated peripherally adjacent said first surface parts of said insert; the improvement wherein said first surface parts are peripherally concave, whereby the cross-sectional outline of said insert has the shape of an hourglass; further wherein said first portions of said inner wall define a clearance with respective said first surface parts of said insert; and further wherein a metal filler body is disposed in at least one said clearance.

3. A dual worm extruder as defined in claim 1 or 2, wherein said second surface parts of said insert are convex.

4. A dual worm extruder as defined in claim 1 or 2, wherein said first portions of said inner wall are planar.

5. A dual worm extruder as defined in claim 2, wherein said filler body has a conical shape.

6. A dual worm extruder as defined in claim 3, wherein said second portions of said inner wall are in a face-to-face contact with the respective said second surface parts of said insert.

* * * * *